United States Patent [19]
Jansma

[11] Patent Number: 5,838,100
[45] Date of Patent: Nov. 17, 1998

[54] FLUORESCENT LAMP HAVING PHOSPHOR LAYER WITH ADDITIVE

[75] Inventor: Jon Bennett Jansma, Pepper Pike, Ohio

[73] Assignee: General Electric Company, Schenectady, N.Y.

[21] Appl. No.: 903,202

[22] Filed: Jul. 14, 1997

Related U.S. Application Data

[63] Continuation of Ser. No. 540,893, Oct. 11, 1995, abandoned.

[51] Int. Cl.$^6$ .............................. H01J 1/62; H01J 63/04; H01J 17/16; H01J 61/35
[52] U.S. Cl. ......................... 313/485; 313/486; 313/487; 313/635
[58] Field of Search .............................. 313/484–89, 567, 313/571–72, 574, 577, 637, 639, 493, 635

[56] References Cited

U.S. PATENT DOCUMENTS

| 3,617,357 | 11/1971 | Nagy | 313/489 |
|---|---|---|---|
| 4,340,512 | 7/1982 | Schreurs et al. . | |
| 4,547,700 | 10/1985 | Landry | 313/487 |
| 4,890,033 | 12/1989 | Ichinomiya et al. | 313/487 |
| 4,988,914 | 1/1991 | Rutfield et al. | 313/486 |
| 5,008,789 | 4/1991 | Arai et al. . | |
| 5,045,752 | 9/1991 | Jansma . | |
| 5,113,118 | 5/1992 | Sigai et al. . | |
| 5,126,166 | 6/1992 | Dutta et al. | 427/67 |
| 5,258,689 | 11/1993 | Jansma et al. . | |
| 5,552,665 | 9/1996 | Trushell | 313/489 |

OTHER PUBLICATIONS

XP 002030238 Database WPI–Derwent—Abstract of Japanese Patent JP 05 093 187 A—Sep. 1991.
Handbook of Chemistry and Physics, 57$^{th}$ Edition Copyright 1918, 1920 by The Chemical Rubber Company.

Primary Examiner—Nimeshkumar Patel
Assistant Examiner—Mack Haynes
Attorney, Agent, or Firm—Pearne, Gordon, McCoy & Granger

[57] ABSTRACT

A fluorescent lamp having no more than one layer inside the glass envelope, the one layer being a phosphor-containing layer which is at least 20 weight percent alumina. The phosphor-containing layer preferably comprises a rare earth triphosphor blend.

14 Claims, 1 Drawing Sheet

FLUORESCENT LAMP HAVING PHOSPHOR LAYER WITH ADDITIVE

This is a continuation of application Ser. No. 08/540,893, filed Oct. 11, 1995 now abandoned.

BACKGROUND OF THE INVENTION

1. Field of the Invention

The present invention relates generally to fluorescent lamps and more particularly to a fluorescent lamp having an improved phosphor layer containing alumina.

2. Description of Related Art

Fluorescent lamps typically contain at least one phosphor layer and a separate barrier layer. The barrier layer, typically of alumina or silica, is applied between the phosphor layer(s) and the glass tube to improve lumen maintenance, improve phosphor utilization, reduce mercury consumption, reduce end discoloration, and improve lamp appearance.

Many existing production processes for fluorescent lamp manufacturing do not have the capability for efficiently applying two layers of coatings. Each coating step increases production losses and requires significant equipment and labor usage. Even when double coating processes are available, a two coat process can be difficult due to interactions between the first layer and the second layer during the second coating step. There is a need for a lamp that combines the phosphor particles, particularly rare earth phosphor blends, with inert barrier materials in a single layer so that the performance of a double-coated lamp can be achieved in a single-coated lamp.

SUMMARY OF THE INVENTION

A mercury vapor discharge lamp is provided which comprises a glass envelope, means for providing a discharge, a discharge-sustaining fill of mercury and an inert gas sealed inside the envelope, and a phosphor-containing layer coated inside the glass envelope. The phosphor-containing layer is at least 20 weight percent alumina. The lamp has no more than one layer inside the glass envelope, said one layer being the phosphor-containing layer. A mercury vapor discharge lamp is also provided with a phosphor-containing layer inside the envelope and adjacent the inner surface of the envelope, the phosphor-containing layer consisting essentially of alumina and a rare earth phosphor system, the phosphor-containing layer being at least 20 weight percent alumina and the alumina being at least 5 weight percent gamma alumina.

DETAILED DESCRIPTION OF THE PREFERRED EMBODIMENTS OF THE INVENTION

Figure 1:
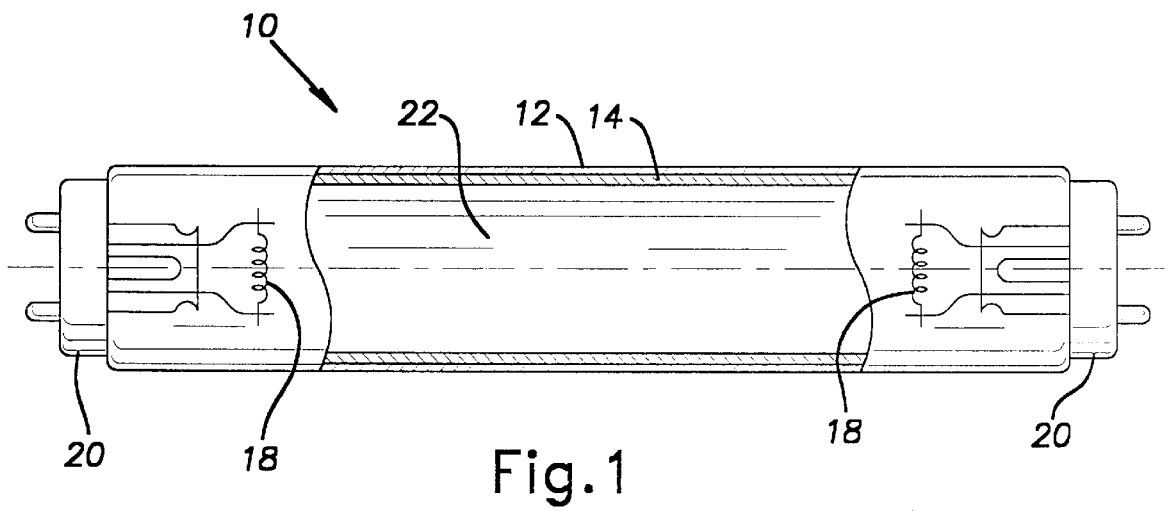
FIG. 1 shows diagrammatically, and partially in section, a fluorescent lamp according to the present invention.

FIG. 1 shows a representative low pressure mercury vapor discharge fluorescent lamp 10, which is generally well-known in the art. The fluorescent lamp 10 has a light-transmissive glass tube or envelope 12 which has a circular cross-section. The inner surface of the glass envelope is provided with a phosphor-containing layer 14 according to the present invention.

The lamp is hermetically sealed by bases 20 attached at both ends, and a pair of spaced electrode structures 18 (which are means for providing a discharge) are respectively mounted on the bases 20. A discharge-sustaining fill 22 of mercury and an inert gas is sealed inside the glass tube. The inert gas is typically argon or a mixture of argon and other noble gases at low pressure which, in combination with a small quantity of mercury, provide the low vapor pressure manner of operation.

The invented phosphor-containing layer 14 is preferably utilized in a low pressure mercury vapor discharge lamp, but may also be used in a high pressure mercury vapor discharge lamp. It may be used in fluorescent lamps having electrodes as is known in the art, as well as in electrodeless fluorescent lamps as are known in the art, where the means for providing a discharge is a structure which provides high frequency electromagnetic energy or radiation.

The phosphor-containing layer 14 contains phosphor particles which are known in the art, such as a relatively inexpensive phosphor which emits a white light, such as a calcium halophosphate activated with antimony and manganese, or alternatively another halophosphate phosphor as known in the art. Preferably, however, the phosphor-containing layer 14 contains a rare earth phosphor system, which is typically a blend of rare earth phosphors. Rare earth phosphor systems are well-known in the art. As used in the specification and claims herein, a rare earth phosphor system includes (1) a triphosphor system such as a red, blue, and green color-emitting phosphor blend as disclosed in U.S. Pats. Nos. 5,045,752; 4,088,923; 4,335,330; 4,847,533; 4,806,824; 3,937,998; and 4,431,941; and (2) phosphor blends which have other numbers of rare earth phosphors, such as systems with 4 or 5 rare earth phosphors. Optionally halophosphate phosphors may be blended with rare earth phosphors but preferably rare earth phosphors would predominate in such a blend. Any fluorescent lamp phosphor or phosphor system known in the art may be used.

The phosphor-containing layer 14 is 30–80, more preferably, 40–70, more preferably 45–75, more preferably 60–70, more preferably 66⅔, weight percent phosphor. The phosphor is preferably a triphosphor blend such as a rare earth triphosphor blend, also referred to as a rare earth triphosphor.

The phosphor-containing layer 14 is at least 20, more preferably at least 25, more preferably at least 30, weight percent alumina, preferably 20–70, more preferably 30–60, more preferably 25–55, more preferably 30–40, more preferably 33⅓, weight percent alumina. The alumina is preferably 0–50, more preferably at least 5, more preferably at least 10, more preferably 10–50, more preferably 10–45, more preferably 25–40, more preferably about 30, weight percent gamma alumina and 50–100, more preferably 55–90, more preferably 60–75, more preferably about 70, weight percent alpha alumina. As a less preferred example, the alumina may be 100% alpha alumina. The gamma alumina has a surface area of 30–140, more preferably 50–120, more preferably 80–100, m$^2$/gm and a particle size (diameter) of preferably 10–500, more preferably 30–200, more preferably 50–100, nm. The alpha alumina has a surface area of 0.5–15, more preferably 3–8, more preferably 4–6, more preferably about 5, m$^2$/gm and a particle size (diameter) of preferably 50–5000, more preferably 100–2000, more preferably 500–1000, more preferably about 700, nm. The alumina should be substantially pure such as 99.99% pure or of high purity substantially without light-absorbing impurities or with a minimum of light-absorbing impurities. The layer 14 is free from the presence of silica.

The phosphor-containing layer 14 is provided on the lamp as follows. The gamma alumina, alpha alumina, and phosphor particles or powders are blended by weight. The resulting powder is then dispersed in a water vehicle with a dispersing agent such as ammonium polyacrylate and a nonionic surfactant such as nonylphenyl-ethoxylate. Then a thickener is added, typically polyethylene oxide, and optionally other dispersing agents, surfactants, and thickeners known in the art may be added. The resulting suspension is typically about 5–20 weight percent powder (alumina and phosphor), 0.5–3 weight percent dispersing agent, 0.05–0.3 weight percent surfactant and 1–5 weight percent thickener. The suspension is then applied as a coating to the inside of the glass tube and heated, as phosphor coatings are applied and heated, which is known in the art. In the heating stage the components other than alumina and phosphor are driven off, leaving only alumina and phosphor behind. The phosphor-containing layer is applied so that the weight of phosphor in the layer (the "coating weight") is 0.5–3, more preferably 0.8–2, more preferably 1–1.2, mg of phosphor per $cm^2$. The lamp preferably has sufficient phosphor to meet the 2950 or 2850 lumen rating. The coating weight of powder or solids (alumina and phosphor combined) is 0.75–4.5, more preferably 1.2–3, more preferably 1.5–1.8, $mg/cm^2$.

The addition of at least 20 weight percent alumina to the phosphor-containing layer of the present invention gives the performance of a double-coated lamp in a single-coated lamp, with the layer providing an effective barrier between the glass tube and the arc-discharge, yielding improved lumen maintenance, improved phosphor utilization, reflection back of UV for further utilization, reduced mercury consumption, and improved lamp appearance.

In the present invention the lamp preferably has no more than one layer inside the glass envelope, said one layer being the described phosphor-containing layer. This layer faces the arc. Less preferably the lamp may have a thin or, less preferably, a heavy, barrier layer of alumina or silica between the invented phosphor-containing layer 14 and the glass tube 12, in this case the phosphor-containing layer still being adjacent the inner surface of the tube.

The following Examples further illustrate various aspects of the invention. All percentages are weight percent unless otherwise indicated.

EXAMPLES 1–11

A series of tests were conducted using F32T8 lamps. In each lamp there was only one layer of material inside the glass tube. The same 3000K triphosphor was used throughout. The alumina used was 30% gamma alumina (90–100 $m^2/gm$ surface area) and 70% alpha alumina (4–6 $m^2/gm$ surface area). Lumens is initial lumens measured. All weights are in grams per lamp. In Examples 1–5, a single layer of triphosphor was used without alumina in the phosphor layer and with no barrier layer. In Examples 6–11, a single layer of triphosphor blended with alumina was used, and there was no barrier layer.

| Example | Triphosphor Weight | Alumina Weight | Percent Alumina | Initial Lumens |
|---|---|---|---|---|
| 1 | 0.32 | 0 | 0 | 1228 |
| 2 | 0.62 | 0 | 0 | 1968 |
| 3 | 0.92 | 0 | 0 | 2384 |
| 4 | 1.20 | 0 | 0 | 2677 |
| 5 | 1.56 | 0 | 0 | 2884 |
| 6 | 1.12 | 0.12 | 10 | 2721 |
| 7 | 1.00 | 0.23 | 20 | 2705 |
| 8 | 0.80 | 0.40 | 30 | 2718 |

-continued

| Example | Triphosphor Weight | Alumina Weight | Percent Alumina | Initial Lumens |
|---|---|---|---|---|
| 9 | 0.72 | 0.48 | 40 | 2706 |
| 10 | 0.60 | 0.59 | 50 | 2728 |
| 11 | 0.48 | 0.72 | 60 | 2700 |

At reduced amounts of triphosphor usage lumen output is maintained with addition of alumina. Comparing Examples 2 and 10, roughly equal amounts of triphosphor are used, but adding alumina increases performance by about 39%. The results of these tests were surprising and unexpected.

Although the preferred embodiments of the invention have been shown and described, it should be understood that various modifications may be resorted to without departing from the scope of the invention as disclosed and claimed herein.

What is claimed is:

1. A mercury vapor discharge lamp comprising a clear glass envelope, means for providing a discharge, a discharge-sustaining fill of mercury and an inert gas sealed inside said envelope, and a phosphor-containing layer coated inside said glass envelope, said phosphor-containing layer being at least 20 weight percent alumina, said alumina in said phosphor-containing layer being 5–50 weight percent gamma alumina, said lamp having no more than one layer inside said glass envelope, said one layer being said phosphor-containing layer, said phosphor-containing layer comprising a phosphor blend comprising red, blue, and green color-emitting phosphors.

2. A lamp according to claim 1, said alumina in said phosphor-containing layer being 10–50 weight percent gamma alumina.

3. A lamp according to claim 1, said alumina in said phosphor-containing layer being 25–40 weight percent gamma alumina.

4. A lamp according to claim 1, said alumina in said phosphor-containing layer being about 30 weight percent gamma alumina.

5. A lamp according to claim 1, said phosphor-containing layer being 25–55 weight percent alumina.

6. A lamp according to claim 1, said lamp being a low pressure mercury vapor discharge lamp having a pair of spaced electrodes, said phosphor-containing layer being 30–80 weight percent phosphor and 20–70 weight percent alumina.

7. A lamp according to claim 6, said alumina in said phosphor-containing layer being 25–40 weight percent gamma alumina, said phosphor being present in a coating weight of 0.8–2 mg of phosphor per $cm^2$.

8. A mercury vapor discharge lamp comprising a clear glass envelope having an inner surface, means for providing a discharge, a discharge-sustaining fill of mercury and an inert gas sealed inside said envelope, and a phosphor-containing layer inside the envelope and adjacent the inner surface of the envelope, said phosphor-containing layer consisting essentially of alumina and a rare earth phosphor system, said phosphor-containing layer being at least 20 weight percent alumina, said alumina in said phosphor-containing layer being 5–50 weight percent gamma alumina, said rare earth phosphor system comprising red, blue, and green color-emitting phosphors.

9. A lamp according to claim 8, said alumina in said phosphor-containing layer being 10–50 weight percent gamma alumina.

10. A lamp according to claim 8, said alumina in said phosphor-containing layer being 25–40 weight percent gamma alumina.

11. A lamp according to claim 8, said alumina in said phosphor-containing layer being about 30 weight percent gamma alumina.

12. A lamp according to claim 8, said phosphor-containing layer being 25–55 weight percent alumina.

13. A lamp according to claim 8, said lamp being a low pressure mercury vapor discharge lamp having a pair of spaced electrodes, said phosphor-containing layer being 30–80 weight percent phosphor and 20–70 weight percent alumina.

14. A lamp according to claim 13, said alumina in said phosphor-containing layer being 25–40 weight percent gamma alumina, said phosphor being present in a coating weight of 0.8–2 mg of phosphor per cm$^2$.

* * * * *

UNITED STATES PATENT AND TRADEMARK OFFICE
CERTIFICATE OF CORRECTION

PATENT NO. : 5,838,100
DATED : November 17, 1998
INVENTOR(S) : Jon Bennett Jansma It is certified that error appears in the above-indentified patent and that said Letters Patent is hereby corrected as shown below:

On title page, under item: [56] References Cited, following the listing of U.S. Patent Documents, please add the centered heading "FOREIGN PATENT DOCUMENTS" and insert under this heading "62-274,545  11/1987  Japan".

Signed and Sealed this

Twenty-third Day of March, 1999

*Attest:*

Q. TODD DICKINSON

*Attesting Officer*  *Acting Commissioner of Patents and Trademarks*